UNITED STATES PATENT OFFICE.

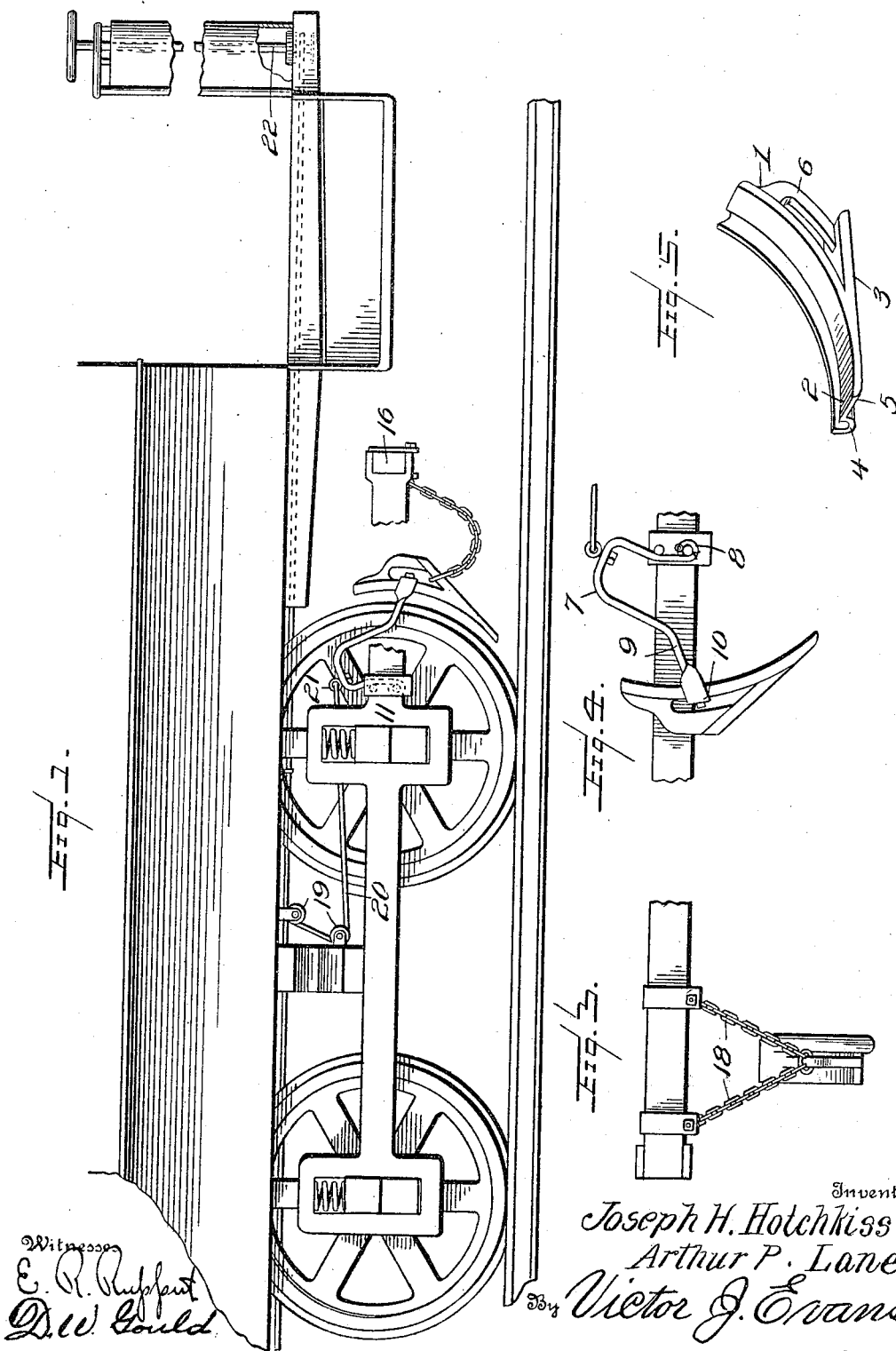

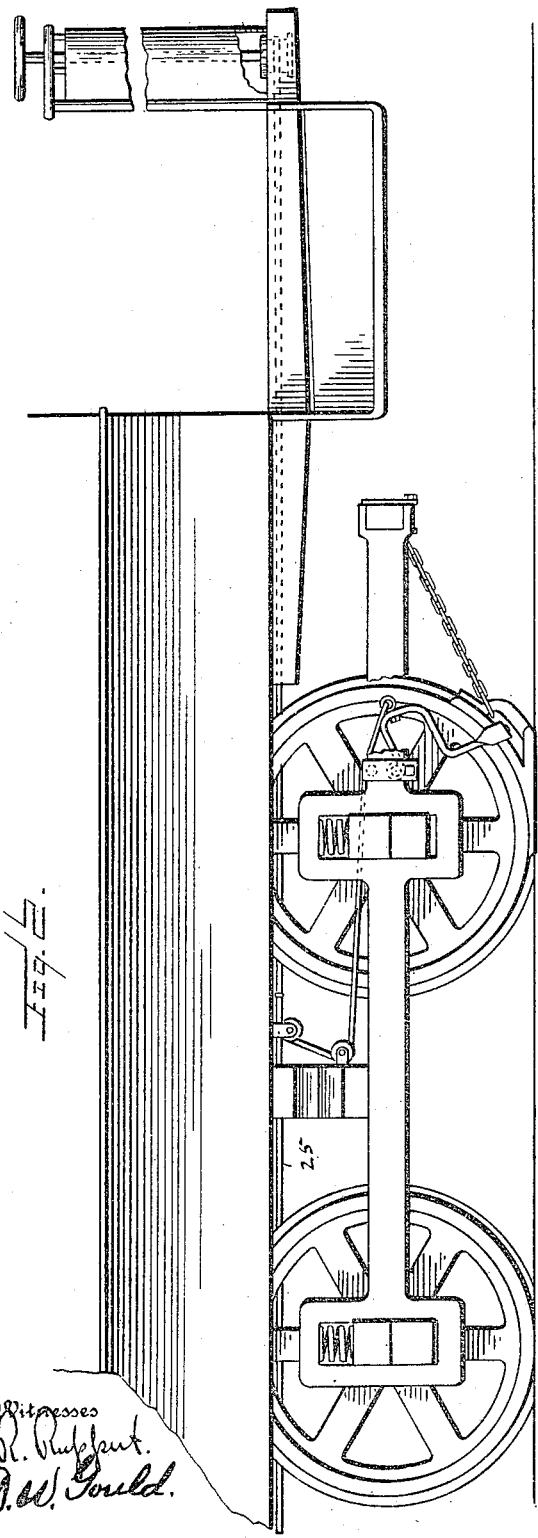

JOSEPH H. HOTCHKISS AND ARTHUR P. LANE, OF DENVER, COLORADO.

VEHICLE-BRAKE.

949,652. Specification of Letters Patent. Patented Feb. 15, 1910.

Application filed March 30, 1909. Serial No. 486,674.

*To all whom it may concern:*

Be it known that we, JOSEPH H. HOTCHKISS and ARTHUR P. LANE, citizens of the United States, residing at Denver, in the county of Denver and State of Colorado, have invented new and useful Improvements in Vehicle-Brakes, of which the following is a specification.

The invention relates to an improvement in vehicle brakes, and is particularly directed to an emergency brake in the use of which the motorman can insure an immediate and effective braking action of the car.

The main object of the present invention is the provision of a brake shoe formed for coöperation with the tread portion of the rail and with the wheel, the shoe being supported on a movable hanger which is controlled by the motorman or other operator.

The invention will be described in the following specification, reference being had particularly to the accompanying drawings, in which:—

Figure 1 is a broken elevation, showing our improved brake mechanism applied to the forward truck of a car, the brake shoe being in inoperative position. Fig. 2 is a similar view with the brake shoe in operative position. Fig. 3 is a front elevation illustrating means for supporting the brake shoe from the truck beam. Fig. 4 is a view in elevation, showing the brake shoe supported by the hanger and illustrating the connection of the latter with one of the truck beams. Fig. 5 is a perspective view of the brake shoe. Fig. 6 is a sectional view, illustrating the means for connecting the supporting chains to the truck beam. Fig. 7 is a sectional view, partly in elevation, illustrating the means for supporting the hanger from the truck beam. Fig. 8 is a plan, partly broken out, illustrating the means for the automatic release of the brake mechanism by the movement of the fender.

Referring particularly to the accompanying drawing, our improved braking apparatus includes a brake shoe 1 formed of metal of appropriate hardness and constructed to provide a wheel bearing surface 2 and a rail bearing surface 3. The wheel bearing surface is curved throughout its length on a radius corresponding to that of the wheel with which it coöperates, and is further formed adjacent one edge with a depression or channel 4 to receive the flange of the wheel, so that the wheel bearing surface proper is at all times accurately positioned relative to the wheel through the coöperation of the wheel flange and channel 4. The rail bearing surface is arranged at an angle to the wheel bearing surface, being so constructed that when the wheel bearing surface is in engagement with the wheel the rail bearing surface will be in contact throughout its length with the rail. At the relatively rear end the rail bearing and wheel bearing surfaces are separated by a comparatively thin portion only of the shoe thereby providing a point 5, for a purpose which will presently appear. The wall of the channel 4 projects below the rail bearing surface, providing a guide to bear against one side of the head of the rail to accurately position the shoe relative to the rail. At the forward portion the parts of the shoe forming the wheel bearing and rail bearing surfaces are connected by a brace 6, which throughout its main length is projected in approximately parallel relation with the wheel bearing surface and spaced therefrom, as shown.

7 represents the shoe hanger comprising a bar of metal bent intermediate its ends into approximately U-shape and formed at one terminal of one arm of the U with a bearing eye 8. Beyond the terminal of the opposing eye of the U the bar is projected at an incline to the normal plane of the arm, as at 9, and terminally bent to provide a lateral portion 10 which is designed to be passed beneath that portion of the shoe forming the wheel bearing surface, and disposed between such portion and the brace 6. The shoe engaging portion of the hanger thus extends transversely of the shoe and is securely riveted in place. Secured to the side beam 11 of the truck is an inverted U-shaped clamp 12 locked in place by a bolt and nut connection 13 joining the lower ends beneath the beam. Projected laterally from the inner side bar of the clamp 12 is a lower pivot pin 14 and an upper stop pin 15, the former being designed to receive the eye 8 of the hanger 7 so as to pivotally support the hanger and shoe. The stop pin is designed to be engaged by the portion of the hanger adjacent the eye in the elevation of the shoe and limit the upward movement of the latter. This function of the braking mechanism is important as it disposes the brake shoe in a position which is normally inactive but yet will permit the shoe to fall by gravity into a braking position.

Secured on the forward cross beam 16 of the truck are spaced clamps 17, which are arranged in spaced relation and equidistant from a point in longitudinal alinement with the hanger 7. Each clamp 17 carries a flexible connector, as a chain 18, and both of said chains are connected at their lower or opposing ends to the brace 6 of the shoe. The shoe is accurately guided in place in its operative movement by the chains and prevented from falling to one side or the other of the rail notwithstanding a possible distortion of the hanger from the previous use of the shoe.

Secured at appropriate points on the vehicle are spaced guide rollers 19, over which passes a cable 20, one end of which extends forward from the lowermost roller to the hanger, being connected to the latter at 21, the opposite end of the cable extending from the uppermost roller to the ordinary braking standard 22 on the forward platform of the car. This standard is designed for operation in the usual manner by the motorman or other controlling operative, and preferably includes a ratchet 23 designed to be engaged by a spring pressed dog 24 so as to secure the standard with the cable in desired adjustment to position the brake shoe as the occasion requires.

In operation it will be understood that when it is desired to set the brakes the motorman by releasing the dog 24 from engagement with the ratchet 23 releases the cable so that the shoe may drop by gravity onto the track, being guided in the movement by the hanger so that the shoe will engage itself in correlation to the wheel as before described. A further movement of the wheel causes the latter to ride up onto the wheel bearing surface of the shoe, in which position the weight of the vehicle so far as the forward wheels of the front truck are concerned is supported entirely by the shoe, inducing a sliding contact instead of the usual contact. An effective braking operation is thus secured.

If desired an additional cable 25 extends to the rear end of the car so that the brake may be effectively operated from that end when desired. It is to be understood, of course, that the forward wheels of the front truck are to be both provided with brake shoes or the forward wheels of each truck may be so provided and under conditions where the vehicle has heavy grades to ascend in which the liability of a loss of power might cause the car to travel backward, the brake shoe may be arranged in rear of the wheels so as to be used to prevent such backward movement.

In connection with the braking mechanism described we contemplate the use of means whereby the brake shoe may be automatically released to braking position by actuation of the fender. As shown in Fig. 8 a fender 26 is connected by a rod 27 with the dog 24, so that in the tilting of the fender in operation by contact with a person or the like the dog will be operated to release the brake shoe for gravital movement to operative position.

Having thus described the invention what is claimed as new, is:—

1. A brake mechanism including a brake shoe, a rigid hanger pivotally supported at one end and secured to the shoe at the opposite end, and flexible connectors secured at one end to the shoe and at the opposite ends to a support, said latter ends of the connectors being spaced apart.

2. A brake mechanism including a brake shoe, a rigid hanger pivotally supported at one end and secured to the shoe at the opposite end, flexible connectors secured at one end to the shoe and at the opposite ends to a support, said latter ends of the connectors being spaced apart, and a manually controlled cable connected to the hanger.

In testimony whereof we affix our signatures in presence of two witnesses.

JOE. H. HOTCHKISS.
ARTHUR P. LANE.

Witnesses:
H. F. JOLLY,
E. E. GOODALE.